United States Patent [19]
Langen et al.

[11] Patent Number: 5,398,801
[45] Date of Patent: Mar. 21, 1995

[54] PRODUCT CONVEYING APPARATUS

[75] Inventors: Manfred Langen; Hans-Peter Schmitz, both of Monchen-Gladbach; Udo Teich, Sprockhovel, all of Germany

[73] Assignee: Barmag AG, Remscheid, Germany

[21] Appl. No.: 945,115

[22] Filed: Sep. 14, 1992

[30] Foreign Application Priority Data

Sep. 12, 1991 [DE] Germany .......................... 41 30 300.8
Sep. 27, 1991 [DE] Germany .......................... 41 32 244.4

[51] Int. Cl.$^6$ ............................................. B65G 47/24
[52] U.S. Cl. ..................................... 198/407; 193/46
[58] Field of Search ............... 198/402, 403, 404, 405, 198/406, 407, 417; 193/46, 48

[56] References Cited

U.S. PATENT DOCUMENTS

| 564,163 | 7/1896 | Schaake | 193/46 X |
|---|---|---|---|
| 1,576,338 | 3/1926 | Ladd | 198/406 X |
| 2,343,521 | 3/1944 | Benning . | |
| 2,775,334 | 12/1956 | Jeremiah | 198/406 X |
| 4,098,391 | 7/1978 | Hernandez . | |
| 4,159,759 | 7/1979 | Nimmrichter | 198/407 |
| 4,411,350 | 10/1983 | Wolfram . | |

FOREIGN PATENT DOCUMENTS

| 0053588 | 6/1982 | European Pat. Off. . | |
|---|---|---|---|
| 1072535 | 12/1959 | Germany . | |
| 2943260 | 5/1981 | Germany . | |
| 557959 | 2/1957 | Italy | 193/46 |
| 8901470 | 1/1991 | Netherlands . | |
| 0837919 | 6/1981 | U.S.S.R. | 198/407 |

Primary Examiner—D. Glenn Dayoan
Attorney, Agent, or Firm—Bell, Seltzer, Park & Gibson

[57] ABSTRACT

A conveying apparatus for supporting an article such as a product carrier during its conveyance is disclosed. The conveying apparatus includes a transferring track segment and a receiving track segment which are positioned laterally side by side, and with the transferring track segment being progressively inclined from a horizontal orientation to a laterally tilted orientation, and with the receiving track segment being progressively inclined from a laterally tilted orientation to a horizontal orientation. As a result, the article being conveyed is rotated about a longitudinal axis and transferred to the receiving track segment. The apparatus finds particular utility in a yarn spinning plant, wherein yarn packages may be conveyed in a horizontal orientation and then rotated to a vertical orientation to facilitate packaging.

12 Claims, 3 Drawing Sheets

PRODUCT CONVEYING APPARATUS

BACKGROUND OF THE INVENTION

The present invention relates to an apparatus for supporting an article during its conveyance along a longitudinal path of travel and for rotating the article about a longitudinal axis during such conveyance.

Conveying systems are known which comprise roller tracks composed of a plurality of rotatable rollers which extend transversely to the direction of conveyance, or coaxially arranged wheels. The articles or products to be conveyed rest upon the roller tracks only by gravity, and often no restraining means are provided for keeping the articles on the roller tracks during their conveyance.

In certain applications, it is desirable to re-orient the articles during their conveyance, and such re-orientation is not possible with conventional roller tracks.

It is accordingly an object of the present invention to provide an article conveying apparatus of the described type which permits the re-orientation of the articles being conveyed along the length of the apparatus, and which involves a relatively small cost.

SUMMARY OF THE INVENTION

The above and other objects and advantages of the present invention are achieved in the embodiments illustrated herein by the provision of a product conveying apparatus comprising a conveying track which includes an article tilting section. The article tilting section includes a transferring track segment and a receiving track segment which are positioned in a laterally side by side arrangement, with the transferring track segment being inclined progressively along its longitudinal length from a substantially horizontal orientation to a laterally tilted orientation, and such that the conveyed article is tilted about a longitudinal axis and is transferred to the receiving track segment as it is conveyed along the path of travel.

The receiving track segment is preferably also inclined progressively along its longitudinal length, but in a reversed configuration, so that it is inclined from a tilted orientation to a substantially horizontal orientation. As a result, the transferring track segment and the receiving track segment form a V-shaped channel therebetween along a common transfer length wherein transfer of the conveyed article to the receiving track segment occurs.

The present invention provides the advantage that a relatively simple structure is able to re-orient each conveyed article from one side to another during its conveyance, with such re-orientation being fully automatic and without contact with external components or manual contact. The re-orientation is also carried out in a short space.

During operation of the conveying apparatus, the article is transported along the conveying track, and upon reaching the article tilting section it undergoes a guided motion which is predetermined by the geometry of the transferring track segment. The product thus travels over the length of the transferring track segment with a constantly increasing inclination. In so doing, it is bound to follow the inclination until its position of equilibrium is exceeded, and the article then completes a tilting motion about a longitudinal axis and toward the receiving track segment. As a result of this tilting motion, the article is taken over and further transported by the receiving track segment.

The possibilities of application of the conveying track in accordance with the present invention are manifold and extend to all branches of trade and industry, in which articles are serially transported on stationarily installed conveying tracks from one location to another.

The conveying track may be provided with one or more article tilting sections, depending on whether the article needs to be tilted once or several times, while it is moved along the conveying track. Such a system may be necessary, for example, for use in an optical inspection zone for the article, when it is necessary to inspect the article from several sides. For example, in one specific embodiment, the article is first tilted at a first location from one side to the other, and then tilted back to its initial position at a second location which follows the first location.

The conveying track of the present invention is designed to serially convey a plurality of similar articles or products. Thus each individual article is adapted to be handled in an identical fashion. It is therefore possible to lay out the conveying track in a particularly simple manner, since it need not meet with an adaptation to different dimensions, weights, geometrical contours or other characteristics of the articles being conveyed.

Each conveyed article may be configured to support a separate product. Thus for example, each article may mount a product supporting mandrel, such as, a yarn package supporting mandrel. The article may also include first and second exterior surfaces which are disposed at an angle to each other, preferably perpendicularly to each other. Thus the article is adapted to rest upon its first surface during conveyance along the transferring track segment and to be tilted about a longitudinal axis and transferred to the receiving track segment. The article then rests upon its second surface. This construction renders it possible for the article to assume the function of a product carrier, and to transport objects of all kinds, which themselves do not possess a suitable contact surface, on which they move along the conveying track. Furthermore, these features also make it possible to transport different objects at the same time and without adaptation of the conveying track, since the latter needs to be designed only for the product carriers.

The above features also render it possible for the conveyed products to be secured relative to their supporting product carriers without changing their positions relative to the carriers.

The fact that the receiving track segment is inclined progressively from a tilted orientation to a substantially horizontal orientation permits the article to be clearly secured when moving in the direction of conveyance, so that an uncontrolled tilting from the transferring track segment to the receiving track segment is prevented with certainty. In accordance with the invention, these features are employed, when the tilting motion must proceed gently in consideration of the product, so as to prevent the product from being damaged.

In this further development of the invention, the product carrier rests inside a V-shaped channel during movement along the common transfer length, thereby preventing a slipping due to gravity. The tilting motion proceeds during the conveyance until the product carrier has completed it.

A product carrier has completed a tilting motion, when it is again in a stable balanced position, after it has been caused to tilt from a stable balance position.

The angle between the legs of the V-shaped channel is dimensioned such that the product carrier is guided and supported on its two exterior surfaces during movement along the transfer length. This ensures that the product carrier rests always with a largest possible surface both against the transferring track segment and against the receiving track segment. This also ensures little pressure per unit of area, since the weight of the product carrier is distributed over a relatively large surface. On the other hand, during the tilting a precise guided motion of the product carrier is achieved, so as to prevent the same from being subjected to shocks.

The transferring track segment and the receiving track segment preferably comprise a plurality of laterally directed and longitudinally spaced rollers. In this embodiment, no separate motor drive is needed for the product carrier to be transported, when the conveying track is provided with a slight slope.

The meshing engagement of the rollers of the transferring and the receiving track in the common transfer length ensures that the product carrier is supported by the rollers of both the transferring track segment and the receiving track segment, so that a smooth change can occur from the one segment to the other.

One potential use of the conveying apparatus of the present invention involves the conveyance of yarn packages, with the packages being supported horizontally during movement toward a packaging station, and then being tilted to a vertical orientation upon arriving at the packaging station. After winding, such packages are normally transported in a manner so that the yarn end and the last winding cannot drop from the package. To this end, the axis of the package extends horizontally. This simple measure prevents the last windings which are normally not secured, from separating as a result of vibrations during transportation.

However, it is useful to load the individual yarn packages on pallets with their axes in a vertical position. This facilitates the placement of the packages on commercially available pallets. Since the packages are placed on the pallets closely side by side, so that the packages do not contact one another on their circumference, the yarn ends are prevented from dropping in this position. Thus, it is important that the packages are tilted once just before reaching the packaging station. This can be accomplished in a simple manner by the use of the conveyor system of the present invention.

The apparatus may include a second like article tilting section which is downstream of the first article tilting station, and so that the articles are tilted back to their original orientation. This enables a contactless conveyance of the yarn packages to the packaging station while preventing a dropping of the yarn ends or last windings, and a further conveyance beyond the packaging station of those packages which are not to be packaged for shipment by reason of inferior quality.

BRIEF DESCRIPTION OF THE DRAWINGS

Some of the objects and advantages of the present invention having been stated, others will appear as the description proceeds, when taken in conjunction with the accompanying drawings, in which.

DETAILED DESCRIPTION OF THE PREFERRED EMBODIMENTS

Figure 1:
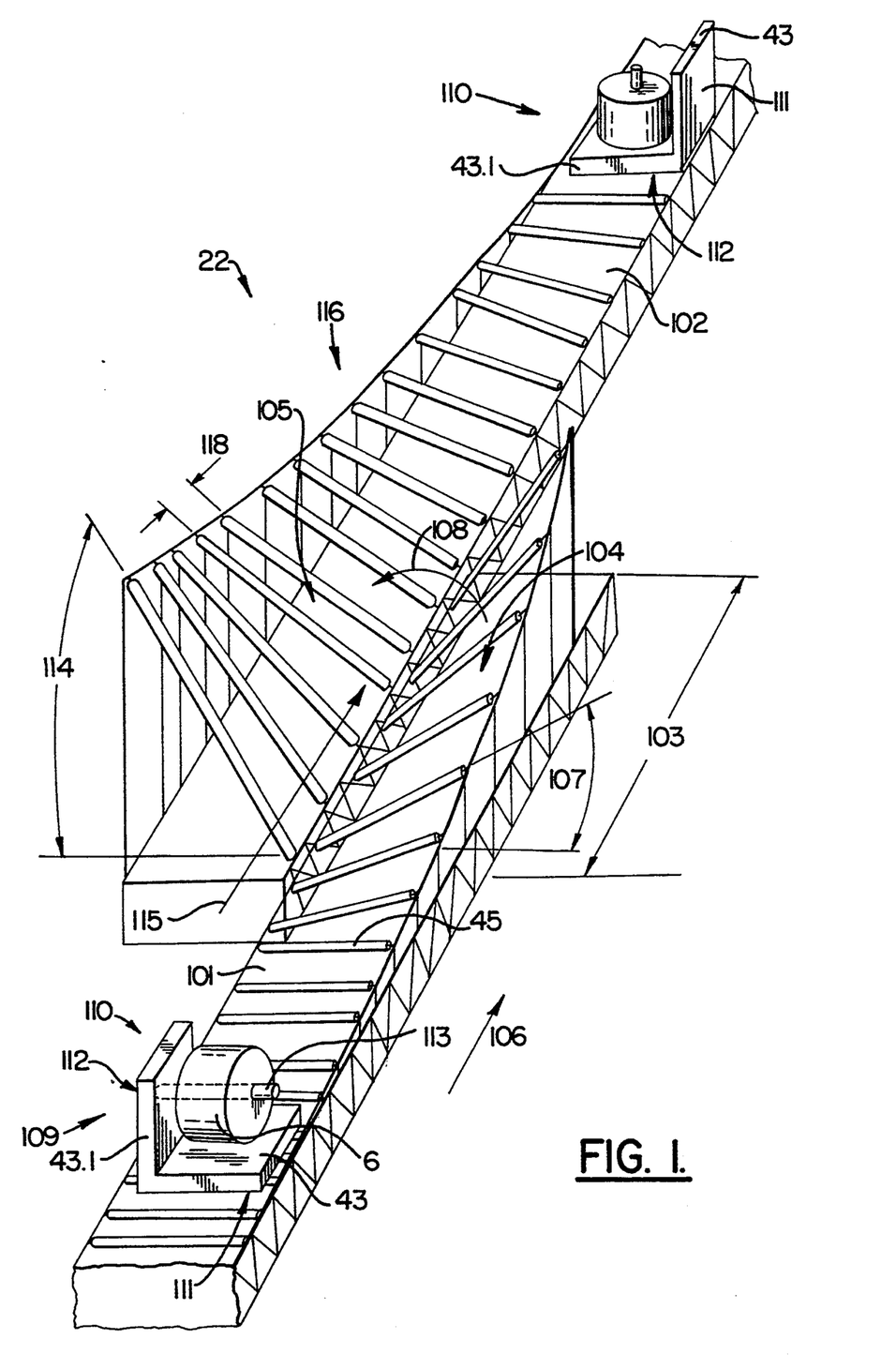
FIG. 1 is a fragmentary perspective view of a conveying track and conveyed articles, and which embodies the features of the present invention.

FIG. 1 shows a conveying track 22 for handling the interdepartmental flow of an article, which in the illustrated embodiment takes the form of a product carrier 109. The conveying track 22 comprises a first length 101 and a second length 102, which overlap so as to define a common transfer length 103. In this common transfer length, the first track length 101 forms a transferring track segment 104, and the second track length forms a receiving track segment 108, with the two segments being positioned in a parallel and lateral side by side arrangement.

When viewed in the direction of conveyance 106, the transferring track segment 104 exhibits a progressively increasing inclination 107 toward the receiving track segment 105. The inclination increases so far that the product carrier 109 which is transported, completes a tilting motion about a longitudinal axis and through the arc indicated at 108 from the transferring track segment 104 to the receiving track segment 105, as it passes over the transfer length 103. In the illustrated embodiment, the conveying track 22 is designed to transport a plurality of similar product carriers 109. Thus, all individually transported product carriers 109 are identical with respect to each other.

The product carrier 109 consists of an L-shaped transport frame 110 which is designed to support a product, and specifically, the frame 110 mounts a mandrel 113 which in turn coaxially receives a full yarn package 6. A further embodiment of a product carrier in accordance with the present invention is illustrated at 20 in FIG. 2.

The transport frames 110 have two exterior contact surfaces 111, 112 which are arranged relative to one another such that one of the contact surfaces 111 rests against the transferring track segment 104, and the other of the contact surfaces 112 rests against the receiving track segment 105.

The transport frames 110 are formed by two perpendicular legs 43, 43.1, with the underside of leg 43 forming the first contact surface 111 prior to passing over transfer length 103, and with the outer surface of back leg 43.1, which is directed to the left in FIG. 1, forming the second contact surface 112.

In the upper portion of FIG. 1, a tilted transport frame 110 is shown, which advances in the direction of conveyance 106. At this point, the originally horizontally disposed transport leg 43 is in a vertical position, and the originally downwardly directed first contact surface 111 faces to the right. Furthermore, the leg originally described as back leg 43.1 rests now on conveying track 22 with its second contact surface 112, which originally faced to the left. Consequently, a tilting motion of the transport frame 110 occurs in a counterclockwise direction at the arc 108, as the latter moves on the conveying track from the transferring track segment to the receiving track segment.

The transport frames 110 are provided with the mandrels 113 which hold the supported products, here the full yarn packages 6. Specifically, one end of each mandrel 113 is securely anchored to the back leg 43.1 of the frame.

Furthermore, in the area of the tilting movement, which is located depending on the gravity position and geometry of the transport frame 110 at a predetermined point within the transfer length 103, the receiving track segment 105 is inclined by the angle 114 from the horizontal such that a V-shaped channel 115 is formed between transferring track segment 104 and receiving track segment 105. When viewed in the direction of conveyance 106, the receiving track segment has a length 116 which continues beyond the tilting location. Over this length 116, the inclination 114 decreases progressively substantially to the horizontal. The V-shaped channel is defined by the opposing surfaces which are formed by the transferring track segment and the receiving track segment.

This embodiment has a further characteristic. The angle between the legs of the V-shaped channel is dimensioned such that the product carrier 109 is guided on essentially both its surfaces 111, 112 between transferring track segment 104 and the receiving track segment 105. In the present embodiment the surfaces 111 and 112 are perpendicular to one another. Consequently, the transferring track segment and the receiving track segment form likewise a right angle over transfer length 103, so as to guide the product carrier 109 with its surfaces 111, 112 being in contacting engagement on both sides.

The transferring track segment 104 and the receiving track segment 105 consist of a plurality of rotatable rollers 45 which are successively arranged in the direction of conveyance 106 and extend transversely thereto, with the spacings 118 between rollers being dimensioned such that in the transfer length 103 the rollers of the one track segment lie between the rollers of the other track segment. The thus alternately succeeding rollers of both tracks form a precise guidance for the transported article, while it is being tilted along transfer length 103.

In operation, the product carrier 109 shown in the foreground of FIG. 1 travels in direction toward the common transfer length 103 of transferring track segment 104 and receiving track 105. In so doing, it assumes at each point along the transferring track segment the angular position which is forced upon it by the transferring track segment 104. Accordingly, it is bound to follow the increasing inclination 107 of transferring track segment 104, the closer it gets to transfer length 103. In so proceeding, the carrier 109 approaches a position in which it tends to tilt in a direction toward the receiving track 105. At the same time, the second contact surface 112 of back leg 43.1 is brought into contact with the rollers of receiving track segment 105. Thus, the product carrier 109 lies securely between transferring track segment 104 and receiving track segment 105, while it continues to advance in direction of conveyance 106.

At this stage, the first contact surface 111 rests against the rollers of transferring track segment 104, and at the same time, the second contact surface 112 rests against the rollers of receiving track segment 105. After passing the tilting point which cannot be shown in detail, the product carrier 109 continues to be guided by transferring track segment 104 in the same direction of rotation through the arc 108, until it is able to securely move along receiving track 105. To this end, the arrangement of transferring track segment 104 and receiving track segment 105 in the form of a V-shaped channel 115 also prevents the product carrier 109 from sliding as a result of the inclination in a direction transversely to the direction of conveyance 106, before it passes over the tilting point, or before it reaches again a non-sliding position after passing the tilting point.

Figure 2:
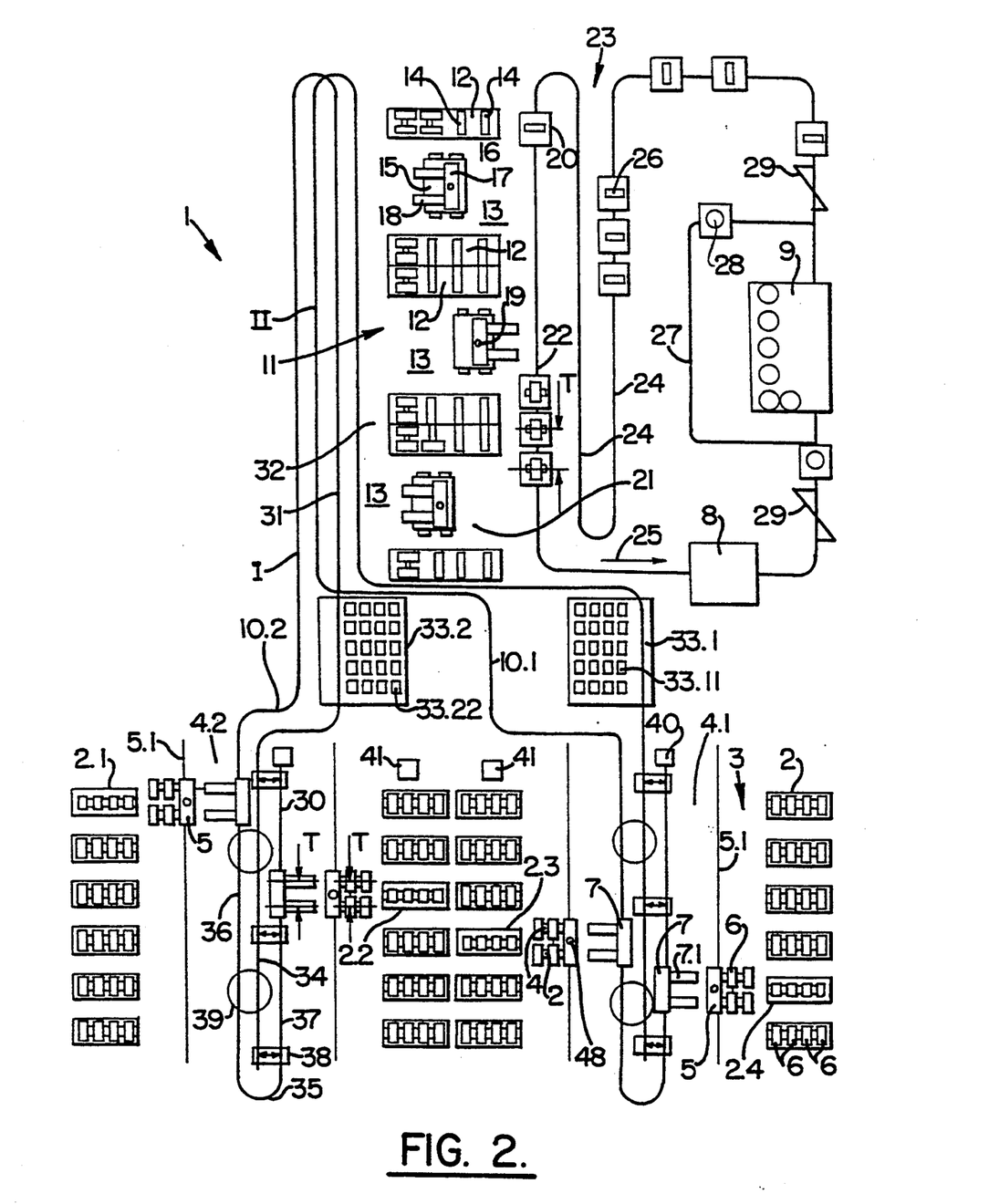
FIG. 2 is a schematic top plan view of a yarn spinning plant which embodies the features of the present invention.

Referring now to FIG. 2, a spinning installation 1 for the continuous production of a plurality of synthetic filament yarns is illustrated, and which includes the present invention at 29. The installation includes a plurality of winding takeup machines 2 which are arranged in rows 3 of takeup machines along a service aisle 4.1, 4.2. Illustrated in this Figure are two service aisles 4.1, 4.2 which are aligned parallel to one another. On each side of each of the service aisles, respectively one column of takeup machines 3 is arranged parallel to service aisle 4.1, 4.2, with the winding spindles of the individual takeup machines projecting perpendicularly into the service aisle.

In each of the service aisles, a doffer 5 is provided to travel along a track 5.1 such that the doffer 5 is able to move along track 5.1 from takeup machine to takeup machine. In the present embodiment, a separate doffer 5 is associated with each column of takeup machines. However, it should be noted that it is also possible to have a single doffer travel along one doffer track in each service aisle, which extends along both columns of takeup machines.

At each contacted and serviced takeup machine 2.1, 2.2, 2.3, 2.4, the doffer 5 receives full packages 6 from the winding spindle and delivers same to a transport carriage 7, which is for this purpose on standby at each contacted and serviced takeup machine 2.1, 2.2, 2.3, 2.4, to receive the full packages. The full packages are transferred to the transport carriage by means of a mandrel 7.1, as will be described in more detail below.

As used in the present application, a doffer is understood to be an apparatus traveling along a machine front from takeup machine to takeup machine, which doffs the produced full packages at the end of a winding cycle. This doffing operation includes the removal of full packages from each serviced winding spindle and the transfer of these full packages to a transport carriage for further transportation.

The time of removing the produced full packages is monitored by the doffer, it being useful that the doffer also requests the respectively needed number of empty tubes.

In a preferred embodiment, the doffer is additionally designed to furnish the just-serviced winding spindle with new empty tubes after the removal and transfer of the full packages, so that the takeup machine is able to continue its winding operation. Such a doffer is known in all details, for example, from DE AS 24 49 415. In the case of this doffer, the necessary number of needed empty tubes is furnished continuously by means of a conveyor chain which moves adjacent the doffer.

Also known from DE OS 21 28 974, is a package doffing carriage which replaces full packages with empty tubes. In this embodiment, the empty tubes are carried along on the package doffing carriage and transferred by means of two gripping arms to the winding spindle of the takeup machine.

Further known from DE OS 21 23 689 is a traveling package doffer, which delivers the full packages to a traveling package transport device. Subsequently, the package transport device is moved to an individual control station, where the individual full packages are subjected either individually or randomly to a quality check, so as to then pass through a packing station.

Associated to each of service aisles 4.1, 4.2 is a conveying track 10.1, 10.2. A plurality of individually movable transport carriages 7 travel along each of the conveying tracks, with each individual transport carriage having its separate drive, and being adapted to stop independently of the other transport carriages.

The conveying tracks extend between the front sides of the winding machine rows and a temporary package storage 11 such that the transport carriages can travel forward and back along this path free of impediments.

To this end, each of the individual conveying tracks is designed as a closed loop, and comprises a forward track segment 30 from the service aisle 4.1, 4.2 to the temporary storage 11, and a return track segment 31 in the reverse direction, with one closed-loop track respectively extending in service aisle 4.1, 4.2, and thence to one of the front ends 32 of storage aisle 13 of the temporary storage 11.

As used in the present application, a forward track segment is described as that distance which the transport carriages loaded with full packages pertaining to a winding spindle cover until the transfer of the full packages to the temporary storage.

One characteristic is to be seen in that the return segment 31 of each conveying track 10.2, 10.2 passes by respectively one empty tube magazine 33.1, 33.2, where the mandrels 7.1 of the transport carriages 7 receive the empty tubes 33.1, 33.22 which are required by a winding spindle.

Another characteristic is that, as shown in FIG. 1, the return segment 31 of each of the closed-loop conveying tracks 10.1, 10.2 extends in the form of a cul-de-sac 34 along service aisle 4.1, 4.2, and that the forward segment has a U-shape in the service aisle, with a first branch 36 connected to temporary storage 11 extending along one of the two sides of the return track segment 31, and with a second branch 37 terminating at the end of service aisle 4.1, 4.2 which is proximate to the temporary storage 11, and extending on the other side of return track 31. At the end remote from the temporary storage 11, the first branch 36 and the second branch 37 are interconnected by a reversing loop 35, and further connected with the return track segment by means of switches.

To this end, the return track segment 31 is connected with the first branch 36 of forward track segment 30 by means of turning switches 39 which redirect the transport carriages 7 coming from the return track segment 31 onto the first branch 36 of forward track segment 30 while reversing the traveling direction. Further, the return track segment 31 is connected with the second branch 37 of forward track segment 30 by means of parallel switches 38 which redirect the transport carriage 7 advancing from the return track segment 31 onto the second branch 37 while maintaining the traveling directions.

When viewed in the traveling direction of the return track segment 31, a total of five switches are successively arranged, with turning switches and parallel switches alternating one another. Furthermore, the turning and parallel switches are arranged in close vicinity.

Such an arrangement of switches ensures that each of the transport carriages 7 need not always travel along the entire U-shaped path, when it is necessary to service one of the winding machines. Further, it is ensured that each of the transport carriages arrives on any possible track at a doffer always such that its projecting mandrels face the doffer in the correct receiving position.

The conveying tracks respectively associated to the service aisles are independent of one another, in that the conveying tracks 10.1, 10.2 extend in different heights I, II along the temporary storage. The conveying heights I, II are spaced from one another at such a large vertical distance that the individual transport carriages of the two conveying tracks are unable to contact each other.

The full packages received by the transport carriages are to be moved to a package processing area which includes a control station 8 for the individual packages, and then a packing station 9. Since the full packages are continuously produced on the winding machines, all transport carriages are employed in a twenty-hour operation, and in accordance with the present invention, the full packages are conveyed from the winding machines to the stationary temporary storage 11 before proceeding to the package processing area.

The temporary storage 11 comprises several high-rise creels 12 which are arranged parallel to one another, and each pair of which forms a storage aisle 13 therebetween. Each of the high-rise creels is provided with a plurality of storage mandrels 14.

The storage mandrels 14 are juxtaposed and superposed in tiers, and project in the direction of storage aisle 13. In each of the storage aisles, a servicing device 15 is provided for forward and backward movement between both ends sides 21 and 32 of the storage aisle.

Each servicing device is provided with a bottom platform which is equipped with wheels 16, and carries an elevator 17 with a pair of transport mandrels 18. The latter serve to receive the full packages delivered by a transport carriage and to transfer same to storage mandrels 14 of one of the high-rise creels, as well as to receive full packages of a winding spindle and to transfer same to individual product carriers 20, as will be described in more detail below.

The pair of mandrels 18 on each servicing device 15 can be moved up and down by means of the elevator 17, the latter being rotatable about a vertical axis 19 such that a mandrel 18 of the servicing device 15 may be aligned with either a mandrel of the transport carriage or with a storage mandrel.

The servicing devices are preferably bipartite. A first part is movable along the storage aisle 13, and a second part is stationarily arranged respectively in front of the storage aisle. The stationary part is adapted for upward and downward movement between conveying heights I, II of the conveying tracks 10.1, 10.2, and is also rotatable by 180°. As a result, the delivered full packages are first received by the stationary part, and subsequently delivered to the movable part for temporary storage.

The individual product carriers 20 transport the temporarily stored full packages during the shift operation of the control station 8 and the packing station 9. To this end, the individual product carriers are adapted for movement between a receiving area adjacent one of the ends 21 of storage aisle and control station 8 as well as packing station 9.

In the present embodiment, this occurs on a peripheral conveyor track 22, which includes a buffer storage track 23 extending in the form of parallel bypass loops 24 between the packing station 9 and the end 21 of storage aisles 13.

The individual product carrier travels along this transport track in direction 25, each individual product carrier 20 being adapted for movement to a stopped position in the receiving area adjacent the end 21 of storage aisles 13, in which the full packages are transferred by means of the servicing device 15.

To transfer the full packages, each individual product carrier includes a mandrel 26 which points in each of the stopped positions with its free end horizontally into the storage aisle. In the intermediate of the three storage aisles, the elevator is pivoted in such a manner and moved to such a height that two transport mandrels 26 of two adjacent individual product carriers 20 can be simultaneously serviced by the two mandrels 18 of the elevator, as will be described in more detail below.

Figure 3:
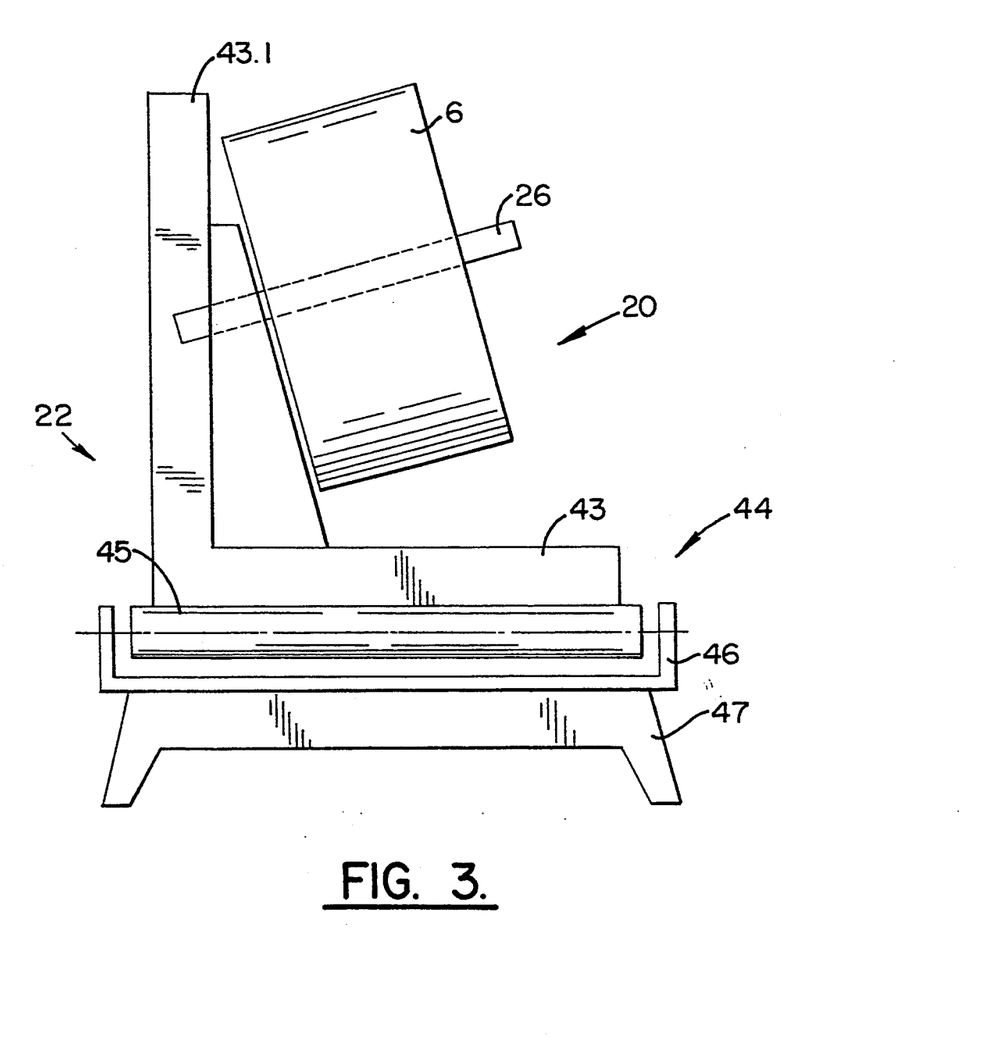
FIG. 3 is an end view of the conveyor track and one conveyed article in accordance with the present invention.

In the embodiment shown in FIG. 3, the peripheral conveyor track 22 consists of a roller track 44. The roller track 44 is formed by a plurality of individual rollers 45 which are rotatably supported on a bearing block 46. The bearing block 46 supports itself on the floor by means of a pedestal 47.

Each individual product conveyor 20 consists of a L-shaped body member 43 which moves with its underside along the roller track. The member 43 is provided with a projecting mandrel 26 which carries in the illustration a full package 6.

As further shown in FIG. 3, the mandrels 26 of the individual product carriers 20 project in a substantially horizontal direction. Thus, the packages lie horizontally during their transportation. However, the packing usually is to be done with vertically extending packages. To this end, it is necessary to rotate the packages by 90°. For this purpose, the embodiment of FIG. 2 is provided with a conveying track which includes an article tilting section 29 preceding the packing station 9, which rotates the product carriers by 90°, as they pass thereover. Thereafter, the full packages which are shown as circles in this rotated view, advance to the packing station to be palletized. Behind the packing station 9, an inversely acting article tilting section 29 reverses the rotation by 90°.

The product carrier 20 is provided with back side 43.1 which is arranged with respect to its base at a right angle, and which is upright during the travel of the individual product carrier 20 from the temporary storage to the individual control station and to the packing station. The product carrier is rotated counterclockwise from the position shown in FIG. 3, with the back side 43.1 being simultaneously supported by an engaging roller track (not shown) such that a continuous counterclockwise turning of the product carrier by 90° proceeds during its movement along the roller track. As soon as the product carrier 20 moves along the now engaging roller track (not shown), the illustrated roller track 44 terminates.

The reverse rotation of the product carrier occurs in the same manner in a clockwise direction.

Inferior qualities are singled out in the control station. However, even such inferior qualities may be still saleable, if need arises. A condition therefor, is that a correspondingly large number of packages of inferior quality is available to enable a palletizing. The redirecting of packages of inferior quality allows to accumulate correspondingly large numbers thereof in the temporary storage.

Since an area of the temporary storage may be reserved to temporarily store packages 28 which were singled out in the control station 8 because of inferior quality, a track 27 bypassing packing station 9 is provided behind the individual control station 8 to return the packages 28 singled out because of inferior quality.

An elevator 40 and an emergency service carriage 41 may be provided in each of the service aisles 4.1, 4.2. The former allows packages to be lifted which in an emergency have been loaded by hand on the emergency service carriage, to the level of the transport carriage.

In the illustrated embodiment, the emergency elevator is arranged at the end of the second branch of the forward track segment, which faces the temporary storage, so that the emergency elevator is unable to interfere with the continuous operation of the transport carriages.

The process for handling of full yarn packages in accordance with the present invention will now be described.

In the present embodiment, four packages are simultaneously produced on each of the winding spindles. Each doffer 5 is provided with two parallel mandrels 42 which are spaced from one another by the distance of the transport gauge I, and designed to receive half the number of the packages which are simultaneously produced on a winding spindle. Thus, in the present embodiment, each of the mandrels 42 receives two packages 6. This operation is described in detail, for example, in DE-OS 29 39 675, to which reference may be made for a further disclosure.

When a winding machine 2 requests the doffing of packages, the associated doffer 5 travels to the corresponding winding machine 2.1, 2.2, 2.3, 2.4, and calls for a free transport carriage 7.

Each transport carriage 7 has two transport mandrels 7.1 which are likewise spaced from one another by the distance T of the transport gauge. The called transport carriage 7 positions itself in the associated doffer position, so that the transport mandrels 7.1 of the carriage 7 are exactly coaxial with the mandrels 42 of the doffer still facing the winding machines.

The doffer receives on each of its two mandrels 42 respectively half of the full packages of a winding spindle, which is two, and then swings its mandrels by 180°, so that the doffer arms carrying the full packages are associated to and exactly aligned with the transport mandrels 7.1 of the waiting carriage 7. The rotation is effected about a vertical axis 48. The doffer now pushes the two packages from each of its arms onto the transport mandrels of the carriages, which are likewise designed to receive two full packages.

The newly loaded transport carriage now moves with its load on the forward track 30 of its conveying path 10.1, 10.2 up to the end 32 of one of the storage aisles 13, each of which is invariably associated to one of the service aisles 4.1, 4.2. There, the mandrels 7.1 of transport carriage 7 are directed into the storage aisle, with the transport carriage stopping in a position in which its mandrels can be brought into alignment with the mandrels 18 on elevator 17 of the servicing device 15. The elevator 17 on servicing device 15 then moves its mandrels 18 which are likewise spaced from one another by transport gauge T, to transport height I, II at which the transport carriage has arrived. Subsequently, the servicing device moves along aisle 13 toward the transport carriage, until the mandrels 18 of servicing device 15 are aligned with the mandrels 7.1 of transport carriage 7, and takes over respectively two full packages.

The unloaded transport carriage travels now on return track segment 31 past the empty tube magazine 33.1 or 33.2, loads there the number of empty tubes required for a winding spindle, and is temporarily moved to a standby position on the portion of the return track segment 31 forming the cul-de-sac until a doffer requests empty tubes.

The loaded servicing device now travels in the direction of the other end 21 of storage aisle 13, with the elevator being moved to a height in which two juxtaposed mandrels of the high-rise creel are unoccupied. Subsequently, a rotation by 90° occurs, so that the mandrels of servicing device 15 are in alignment with the free mandrels of the high-rise creel. The full packages are then delivered to the high-rise creel and temporarily stored.

The above functions repeat themselves continuously during a full twenty-four hour day.

Unless the individual control station and the packing station are occupied, the individual product carriers 20 are moved in position at one end 21 of storage aisle 13. Each of the individual product carriers 20 possesses only one transport mandrel, however the dimensions of the product carriers are selected such that the two mandrels of two closely adjoining individual product carriers are likewise spaced from one another by the distance of transport gauge T.

In this position, the mandrels 18 of servicing devices 15 can be brought in alignment with the mandrels 26 of the two product carriers 20.

To this end, the servicing device removes from two adjacent storage mandrels of one level respectively one full package, rotates by 90° in the direction of the individual product carriers, and moves the mandrels 18 to a height which is identical with the height of the mandrels 26 of individual product carriers 20. Thereafter, the two individual product carriers 20 are started up from their stopped position and loaded at the same time, so that they can leave for the individual control station and the packing station.

In the drawings and specification, there has been set forth a preferred embodiment of the invention, and although specific terms are employed, they are used in a generic and descriptive sense only and not for purposes of limitation.

That which is claimed is:

1. An apparatus for supporting an article during its conveyance along a longitudinal path of travel and for rotating the article about a longitudinal axis during such conveyance, and comprising conveying track means including an article tilting section which comprises a transferring track segment and a receiving track segment which are positioned in a laterally side by side arrangement, with said transferring track segment being inclined progressively along its longitudinal length from a substantially horizontal orientation to a laterally tilted orientation, and a plurality of articles which are adapted to be conveyed along said path of travel, with each of said articles comprising first and second surfaces which are disposed at an angle with respect to each other and such that each article is adapted to rest upon its first surface during conveyance along said transferring track segment and to be tilted about a longitudinal axis and transferred to said receiving track segment and so that the article rests upon its second surface during conveyance along said receiving track segment, each of said articles being configured to support a separate product and mounting a mandrel adapted to receive a yarn package coaxially thereupon, and wherein said mandrel is disposed substantially horizontally when the article is oriented such that its first surface rests upon a horizontal surface and said mandrel is disposed substantially vertically when the article is oriented such that its second surface rests upon a horizontal surface.

2. The apparatus as defined in claim 1 wherein said receiving track segment is inclined progressively along its longitudinal length from a tilted orientation to a substantially horizontal orientation, and such that the transferring track segment and the receiving track segment form a V-shaped channel therebetween in a common transfer length wherein transfer of the conveyed article to said receiving track segment occurs.

3. The apparatus as defined in claim 2 wherein the maximum angle formed by said V-shaped channel when viewed in transverse cross-section is substantially equal to the angle formed between said first and second surfaces of said articles.

4. The apparatus as defined in claim 3 wherein the maximum angle formed by said V-shaped channel when viewed in transverse cross-section and the angle formed between said first and second surfaces of said articles are both equal to about 90 degrees.

5. The apparatus as defined in claim 2 wherein each of said transferring track segment and said receiving track segment comprises a plurality of laterally directed and longitudinally separated rollers.

6. The apparatus as defined in claim 5 wherein, in said common transfer length, the rollers of the transferring track segment lie between the rollers of the receiving track segment.

7. The apparatus as defined in claim 5 wherein said conveying track means further includes a second article tilting section which is located downstream of said first mentioned article tilting section, said second article tilting section comprising a transferring track segment and a receiving track segment which are positioned in a laterally side by side arrangement, with said transferring track segment being inclined progressively along its longitudinal length from a substantially horizontal orientation to a laterally tilted orientation, and with said receiving track segment being inclined progressively along its longitudinal length from a tilted orientation to a substantially horizontal orientation, and such that the articles are tilted back to their original orientation during conveyance along said second article tilting section.

8. The apparatus as defined in claim 1 wherein said transferring track segment and said receiving track segment each comprises a single line of laterally directed and longitudinally separated rollers.

9. The apparatus as defined in claim 1 wherein each of said articles further comprises two side walls which are angularly joined together along respective side edges and so that the side walls define respective inner surfaces which face toward each other and respective outer surfaces which comprise said first and second surfaces and which face away from each other, and said mandrel is mounted to said inner surface of one of said side walls.

10. The apparatus as defined in claim 9 wherein said side walls are disposed in respective planes which are substantially perpendicular to each other.

11. The apparatus as defined in claim 10 wherein said mandrel extends substantially perpendicularly from said inner surface of said one of said side walls.

12. An apparatus for supporting an article during its conveyance along a longitudinal path of travel and for rotating the article about a longitudinal axis during such conveyance, and comprising     conveying track means including an article tilting section which comprises a transferring track segment and a receiving track segment which are positioned in a laterally side by side arrangement, with said transferring track segment being inclined progressively along its longitudinal length from a substantially horizontal orientation to a laterally tilted orientation, and with said receiving track segment being inclined progressively along its longitudinal length from a tilted orientation to a substantially horizontal orientation, and such that the transferring track segment and the receiving track segment form a V-shaped channel therebetween in a common transfer length wherein transfer of the conveyed article to said receiving track segment occurs,     said transferring track segment and said receiving track segment each comprising a plurality of laterally directed and longitudinally separated rollers, and wherein, in said common transfer length, the rollers of the transferring track segment lie between the rollers of the receiving track segment, and a plurality of articles which are adapted to be conveyed along said path of travel, with each of said articles comprising first and second surfaces which are disposed at an angle with respect to each other and such that each article is adapted to rest upon its first surface during conveyance along said transferring track segment and to be tilted about a longitudinal axis and transferred to said receiving track segment and so that the article rests upon its second surface during conveyance along said receiving track segment.

\* \* \* \* \*